United States Patent
Pozgainer

(10) Patent No.: US 6,360,765 B1
(45) Date of Patent: Mar. 26, 2002

(54) FUEL TANK

(75) Inventor: Gunther Pozgainer, Graz (AT)

(73) Assignee: Tesma Motoren und Getriebetechnik, Weiz (AT)

(*) Notice: Subject to any disclaimer, the term of this patent is extended or adjusted under 35 U.S.C. 154(b) by 0 days.

(21) Appl. No.: 09/670,786

(22) Filed: Sep. 27, 2000

(51) Int. Cl.$^7$ ............................................... F02M 37/04
(52) U.S. Cl. .............................. 137/15.01; 137/565.34; 137/592; 123/509; 123/514
(58) Field of Search ............................ 137/565.34, 592, 137/560, 15.01, 15.18; 123/509, 514

(56) References Cited

U.S. PATENT DOCUMENTS 4,869,225 A * 9/1989 Nagata et al. ............... 123/509
5,080,077 A * 1/1992 Sawert et al. ............... 123/514

* cited by examiner

Primary Examiner—A. Michael Chambers
(74) Attorney, Agent, or Firm—Clark Hill PLC

(57) ABSTRACT

A metal fuel tank (1) with two tank shells (1a, 1b) which are welded together, an electrically driven fuel supply unit (2) inside the tank, and also with lead-in ducts for at least one metal fuel line (3) and for a connection device for supplying electricity to the fuel supply unit (2). The tank (1) is produced in such a way as to mount the fuel supply unit (2) from inside the tank (1) before the tank shells (1a, 1b) are welded together, and to have the lead-in ducts running through at respectively separated points through the tank shells (1a, 1b) which are created using gas-tight means of connection.

18 Claims, 2 Drawing Sheets

FUEL TANK

BACKGROUND OF THE INVENTION

1) Field of the Invention

The invention relates to a metal fuel tank with two tank shells which are welded together, an electrically driven fuel supply unit inside the tank, and also with lead-in ducts for at least one metal fuel line and for a connection device for supplying electricity to the fuel supply unit.

2) Description of the Related Art

Usually, the fuel supply unit is inserted into the completed fuel tank (top and bottom tank shells previously welded together) and the tank fuel supply is fastened to the tank by means of screw connections such as crown nuts and similar, or by screwing in the fuel supply unit as one would a bayonet. Rubber seals serve as sealing elements.

A specially designed device for sealing a fuel supply unit in a fuel tank is known from EP-A 0 921 299. Here, the fuel supply unit is inserted into a pod as a compact unit within housing. The pod has a cover through which at least one inlet nozzle and one electrical connection for the supply unit are fed through while the pod can be inserted into the fuel tank together with the whole unit by means of a tank adapter cap which is fastened to a tank flange. In this case, a rubber seal is provided which functions as an elastic bellows and sits in-between the pod cover and the tank flange.

State-of-the-art technology offers solutions which are all related in that they have large-volume rubber seals as sealing elements through which the fuel's hydrocarbons can diffuse, since these substances are rubber-permeable. Recently in some countries, legal regulations have been planned regarding the requirements on the density of fuel tanks, especially regarding the diffusion of hydrocarbons to the outside. These regulations are much more severe than the ones applicable until now. The known solutions, especially the ones described above, can no longer fulfill these regulations or requirements.

SUMMARY OF THE INVENTION

Thus, the invention is based on the task of creating a fuel tank of the above type in such a way as to permit either no emission of hydrocarbons from the tank into the outside world or an emission reduced to an irrelevant minimum.

The invention solves this task by mounting the fuel supply unit from inside before the tank shells are welded together, and by having the lead-in ducts running through at respectively separated points through the tank shells and which are created using gas-tight means of connection.

The invention presented herein no longer requires a fuel opening in the tank for inserting the fuel supply unit, this opening being critical with regards to a gas-tight sealing. According to the invention, the fuel supply unit is already attached inside the tank while the tank is still two separate tank shells. The lead-in ducts for the fuel lines and for the connection device of the electric supply is also created locally and using gas-tight connection methods before welding the tank parts. Thus, the finished tank can be so tight as to no longer allow minimal leakage or no leakage of any hydrocarbon emissions outward.

The fuel supply unit can be mounted in an especially easy and useful manner by providing fastening elements which are placed on the inner side of the tank, more especially welded to it, onto which the fuel supply unit can be mounted.

Concerning gas-tight connecting methods, it is especially useful to weld or solder one metal part or component of the fuel line and/or of the connecting device to the tank. Welded or soldered seams are practically gas-tight.

The lead-in ducts can be created in an especially easy way by feeding the metal parts or components through a bore (or similar) in the tank and by welding or soldering them in the area of a peripheral flange which surrounds the bore.

For practical purposes, the metal part or component maybe the fuel line itself or a coupling nipple which is connected to it, especially by welding.

The connection to the fuel supply unit in the inside of the tank is also extremely simple. Here, the internal fuel line, which is more particularly a flexible hose, connects the fuel supply unit to the end area of the fuel line leading into the inside of the tank.

Also in the area of the connecting device's lead-in ducts, a mainly gas-tight sealing should be ensured. For this, the metal part or component of the connecting device is intended to be a metal sleeve.

The feeding of the electrically conductive parts or elements through the connecting device is also important. In order to guarantee the best gas-tight sealing possible, the connecting device has a plastic part which sits inside of a metal sleeve and is sealed off from the encased conductive elements by at least one rubber seal.

This is also the only place(s) where at least one rubber seal can be used and it may have rather small dimensions. The mainly gas-tight seal is supported if the rubber seal is an O-ring seal which sits in a surrounding groove of the plastic part.

The source material of the rubber seal also plays a certain role. Preferable are seals based on fluorine elastomers, e.g. on FCM or fluorine silicone rubber, which are especially gas-tight.

BRIEF DESCRIPTION OF THE DRAWINGS

Further characteristics, advantages and details of the invention will now be described using the drawings which show one invention example. The following figures show.

DETAILED DESCRIPTION OF THE PREFERRED EMBODIMENT

Figure 1:
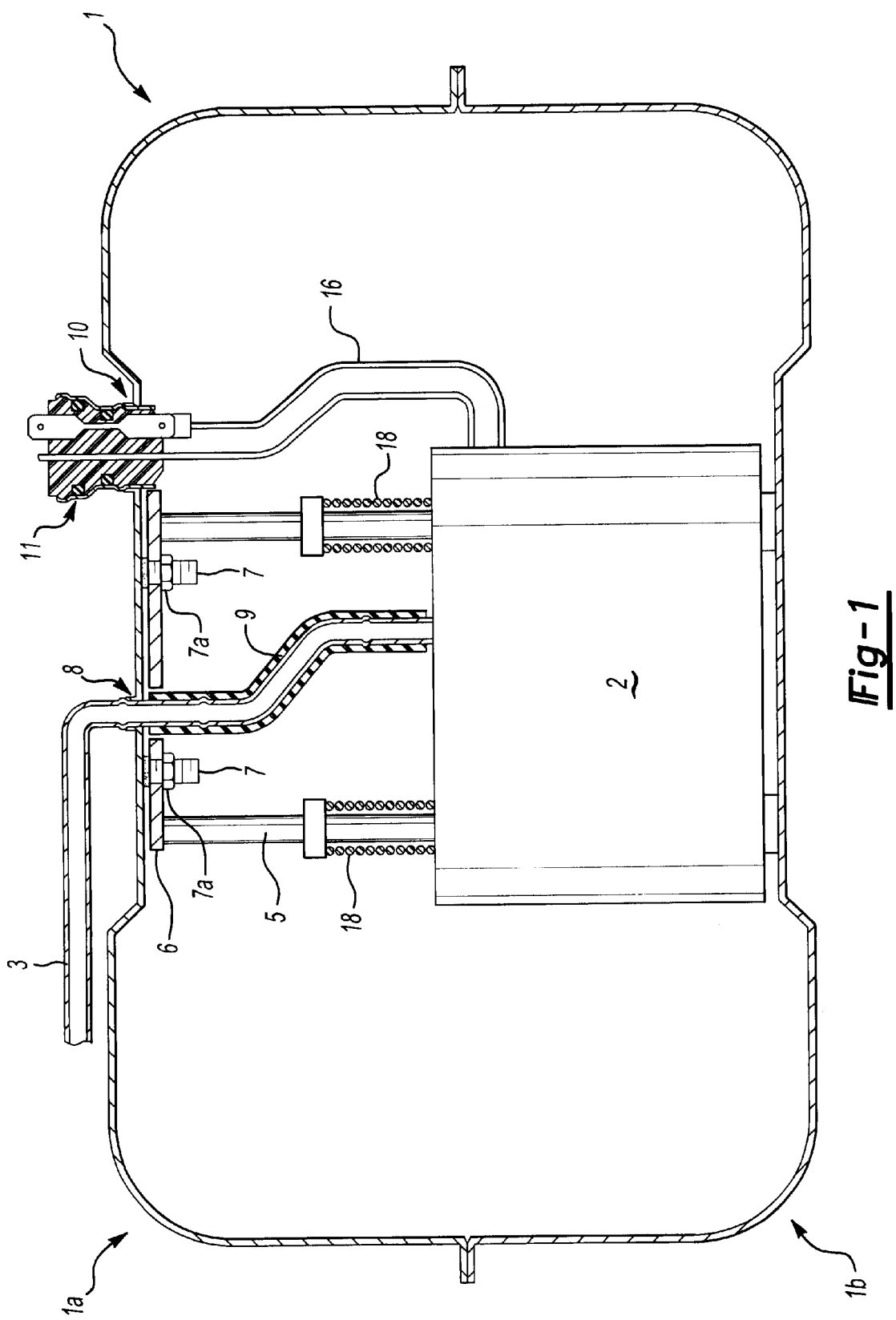
FIG. 1 is a cross-section through a fuel tank designed according to the invention, in schematic view.

The metal fuel tank 1 (especially when made of sheet metal) comprises a top tank shell 1a and a bottom tank shell 1b which are basically congruent in form and size. The two tank shells 1a, 1b are each surrounded in the usual manner by a flange in order that they may be welded to each other. According to the present invention, however, the two shells are welded together only after the fuel supply unit 2 has been inserted and fastened (as will be described more precisely soon) and only after the lead-in ducts for the fuel lines and for the connection device have been installed. This connecting device supplies drive energy to the fuel supply unit as well as to all the necessary connections on the inside of the tank 1.

In the represented model, the fuel supply unit 2 is fastened to the inner side of the top tank shell 1a. For this purpose, the fuel supply unit 2 is connected to supporting element 5 which bear fastening elements 6 on their free ends. Threaded bolts 7 or similar are welded to the inner side of the top tank shell 1a, and are inserted through respective holes in the fastening element 6. The installation of the fuel supply unit 2 is finished with the screwing on of nuts 7a to the top tank shell 1a. After having completed the fuel tank 1, springs 8 (which operate and are arranged in the common manner) ensure that the fuel supply unit 2 constantly stands erect on the bottom of the fuel tank 1 due to the welding of the two parts 1a and 1b.

In order to feed the lines (which are provided for taking out fuel and, if necessary, to put it back), special precautions have been made to prevent the fuel's hydrocarbons from escaping the tank. These measures will be further explained using the described fuel line 3.

Figure 2:
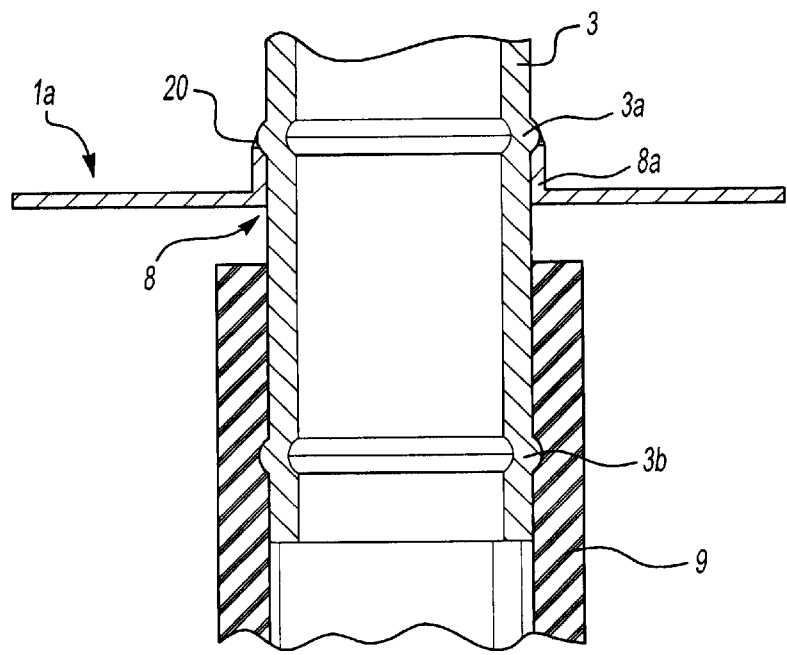
FIG. 2 is a detail from FIG. 1 in the area of the lead-in duct of a fuel line.

The top tank shell 1a provides a corresponding opening or bore 8 through which the metal fuel line 3 or a similarly metal coupling nipple can be fed into the inside of the tank. The metal coupling nipple can be connected or more particularly welded onto the metal fuel line 3. In the following, we will refer to the represented model which does not have a nipple. As can especially be deduced from FIG. 2, the edge of the bore 8 is surrounded by a peripheral flange 8a which is slightly curved upwards and outwards. The bore dimensions or their diameters are correspondingly adjusted to the dimensions of the fuel line 3. A bulge-shaped mould 3a, which is provided or formed at the fuel line 3, creates a dead stop and positions the fuel line 3 in front of the peripheral flange 8a. The fuel line 3 is welded to the top tank shell 1a in the area of the peripheral flange 8a while creating a welding seam which runs all along the whole circumference of the peripheral flange 8a. The two metal parts can also be completely soldered together instead of being welded. The area of the welding seam or of the soldering is designated in FIG. 2 by the reference number 20.

The end of the fuel line 3 juts a few centimeters into the inside of the fuel tank 1 so that an inner fuel line 9, coming from the fuel supply unit 2, can be mounted with its free end and, if necessary, secured by a hose clamp or similar. This fuel line can be a flexible rubber hose, for instance. Here too a mould 3b can be additionally provided on the line 3. The welded or soldered connection of the two metal parts—fuel line/coupling nipple and peripheral flange 8a—ensures a completely gas-tight lead-in duct for the fuel line 3.

Also the electrical connection which has to be fed into the inner of the tank can be created as mainly gas-tight, i.e., without fuel components—specially hydrocarbons-being able to leak out to any considerable degree.

Figure 3:
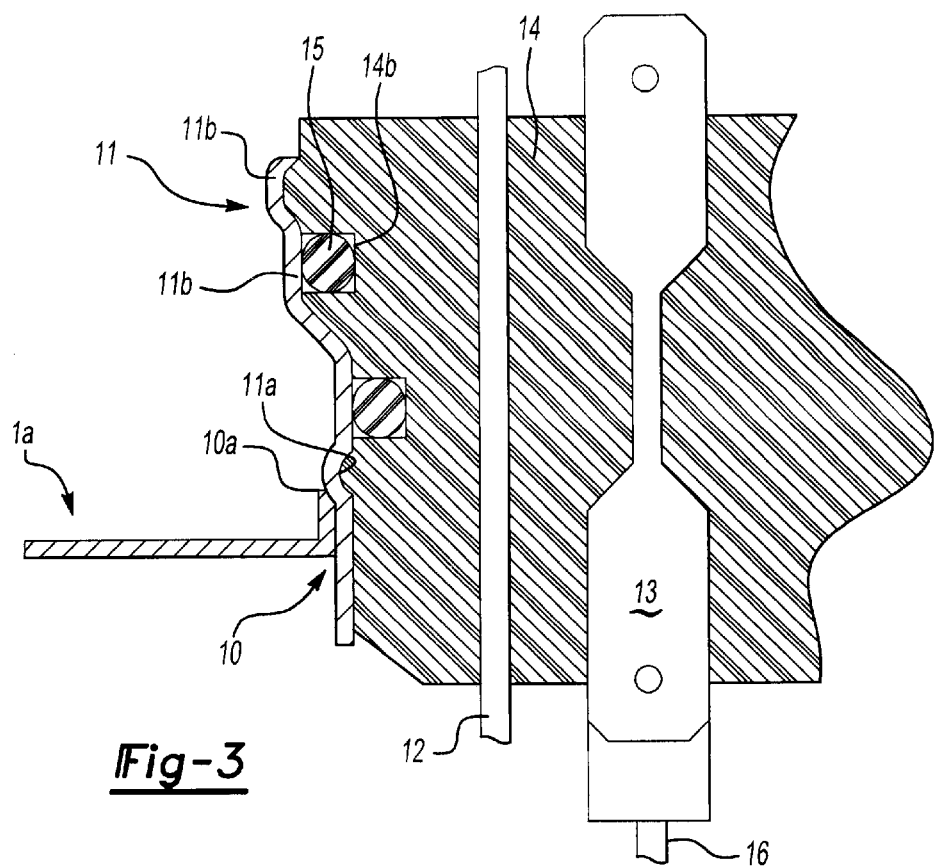
FIG. 3 is also a detail from FIG. 1 in the area of the lead-in duct for a connection device for electrical supply.

For this purpose, the top tank shell 1a has an opening or bore 10 with a surrounding peripheral flange 10a jutting outwards, as is especially shown in FIG. 3. In order to accommodate one of the peripheral areas of the metal sleeve 11 (which belongs to the electrical connection device), the dimensions of the bore 10 are such that it is able to be completely welded or soldered to the peripheral flange 10a, analogous to FIG. 2. Starting from the above-mentioned peripheral areas (limited by a bulge-shaped mould 11a), which serves as a dead stop for the peripheral flange 10a, the metal sleeve 11 has several extension areas 11b which stepwise enlarge the diameter of the sleeve 11. In order to create an electrically conductive connection, either a line 12, or a plug connection 13 can be encased within an all-plastic part 14, as shown in FIG. 3. The number of lines 12 or plug connections 13 depends on the required amount of connecting devices 16 to the fuel supply unit 2. The connection part 13 is therefore connected to the electrical conductors in the common fashion.

The external appearance of the all-plastic part 14 is adjusted to the inside of the metal sleeve 11 in such a way that the all-plastic part 14 can be fit exactly into the metal sleeve 11. The top edge area of the plastic part 14 has a slightly smaller diameter so that the top edge area of the metal sleeve 11 can be crimped inwards. Additionally, the plastic part 14 is provided with two surrounding grooves 14b in order to accommodate one O-ring seal 15 each. For optimizing the sealing effect and the required gas-tightness, the two O-ring seals 15 are made of corresponding elastomers. Especially the two ring seals 15 can be made of different materials, i.e. with an FCM and fluorine silicone rubber base. If there is any penetration by hydrocarbons into the area of the electrical supply's lead-in duct for the fuel supply unit 2 detectable at all, the respective emissions are in any case minimal.

The invention is not limited to the represented model. It should be mentioned here, for instance, that a welding or soldering of the metal parts in the area of the lead-in duct is also possible from inside and that with reference to the metal sleeve and the lead-in duct of the cable or lines through the plastic part, other measures can also be taken.

What is claimed is:

1. A method of assembling a fuel tank assembly wherein the fuel tank assembly includes a top tank shell; a bottom tank shell for matings engaging with the top tank shell to define a fuel chamber therebetween; an electrically driven fuel supply unit; at least one fastening element, and at least one supporting element, said method including the steps of:
    fixedly securing the fastening element to the top tank shell;
    securing the supporting element between the fastening element and the fuel supply unit to support the fuel supply unit from the top tank shell; and
    fixedly securing the bottom tank shell to the top tank shell to enclose the fuel supply unit within the fuel chamber and between the top and bottom tank shells.

2. A method as set forth in claim 1 wherein the bottom tank shell is fixedly secured to top tank shell after the fuel supply unit is secured to the top tank shell.

3. A method as set forth in claim 2 further including connecting a fuel line between the fuel supply unit and the top tank shell.

4. A method as set forth in claim 3 further including extending the fuel line through a first bore in the top tank shell and providing a gas tight seal between the fuel line and the top tank shell.

5. A method as set forth in claim 4 further including connecting an electrical connecting device between the top tank shell and the fuel supply unit.

6. A method as set forth in claim 5 further including extending the connecting device through a second bore in the top tank shell and providing a gas tight seal between the connecting device and the top tank shell.

7. A method as set forth in claim 6 further including connecting each of the fuel supply unit, fuel line and electrical connecting device to the top tank prior to fixedly securing the bottom tank shell to the top tank shell to enclose the fuel chamber.

8. A fuel tank assembly comprising:
    a top tank shell;
    a bottom tank shell matings engaged and fixedly secured to said top tank shell and defining a fuel chamber therebetween;
    an electrically driven fuel supply unit disposed in said fuel chamber between said top and bottom tank shells;

at least one fastening element fixedly secured to said top tank shell and disposed within said fuel chamber; and at least one supporting element fixedly secured between said fastening element and said fuel supply unit for fixedly securing said fuel supply unit to said tank assembly within said fuel chamber between said top and bottom tank shells.

9. A fuel tank assembly as set forth in claim 8 further including a first bore extending through said top tank shell for receiving a fuel line therethrough, said fuel line coupled in fluid communication with said fuel supply unit and fixedly secured to said top tank shell to provide a gas tight seal between said first bore and said fuel line.

10. A fuel tank assembly as set forth in claim 9 further including a second bore extending through said top tank shell and spaced from said first bore for receiving an electrical connecting device connected to said fuel supply unit for suppling electricity thereto.

11. A fuel tank assembly as set forth in claim 10 further including a pair of spaced apart elongated supporting elements secured to and extending between said fastening element and said fuel supply unit for supporting said fuel supply unit between said top and bottom tank shells.

12. A fuel tank assembly as set forth in claim 11 wherein said connecting device includes a sleeve inserted within said second bore and fixedly secured to said top tank shell to provide a gas tight seal between said sleeve and said second bore.

13. A fuel tank assembly as set forth in claim 12 wherein said connecting device includes an insulation part seated within and sealed against said sleeve for supporting an electrically conductive connection coupled to fuel supply unit.

14. A fuel tank assembly as set forth in claim 13 wherein said connecting device includes at least one O-ring seal secured between said sleeve and said insulation part for providing a gas tight seal therebetween.

15. A fuel tank assembly as set forth in claim 14 wherein said insulation part includes a surrounding groove for supporting said seal between said sleeve and said insulation part.

16. A fuel tank assembly as set forth in claim 15 wherein said first bore is defined by a peripheral flange and said fuel line is welded to said peripheral flange.

17. A fuel tank assembly as set forth in claim 10 wherein said second bore is defined by a peripheral flange and said sleeve is welded to said peripheral flange.

18. A fuel tank assembly as set forth in claim 7 wherein said top tank shell is welded to said bottom tank shell.

* * * * *

UNITED STATES PATENT AND TRADEMARK OFFICE
CERTIFICATE OF CORRECTION

PATENT NO. : 6,360,765 B1
DATED : March 26, 2002
INVENTOR(S) : Gunther Pozgainer It is certified that error appears in the above-identified patent and that said Letters Patent is hereby corrected as shown below:

Title page,
Item [30], Foreign Application Priority Data, insert -- Claim of Foreign Priority under 35 U.S.C. §119 for Austrian Application No. GM-665/99 (now AT 5218U1) filed on September 27, 1999. --

Column 2,
Line 8, please delete "maybe" and insert -- may be --.

Column 3,
Line 47, please delete "specially" and insert -- especially --.
Line 47, please delete "hydrocarbons-being" and insert -- hydrocarbons being --.

Column 4,
Lines 26 and 62, please delete "matings" and insert -- matingly --.
Line 39, please delete "to top tank shell" and insert -- to the top tank shell --.

Column 5,
Line 17, please delete "suppling" and insert -- supply --.

Column 6,
Line 4, please delete "to fuel supply" and insert -- to the fuel supply --.
Line 17, please delete "claim 10" and insert -- claim 16 --.
Line 20, please delete "claim 7" and insert -- claim 17 --.

Signed and Sealed this

Sixth Day of July, 2004

JON W. DUDAS
*Acting Director of the United States Patent and Trademark Office*